July 2, 1946.  B. G. OLVING  2,403,115
ELECTRIC SADIRON
Filed Dec. 11, 1944  3 Sheets-Sheet 3
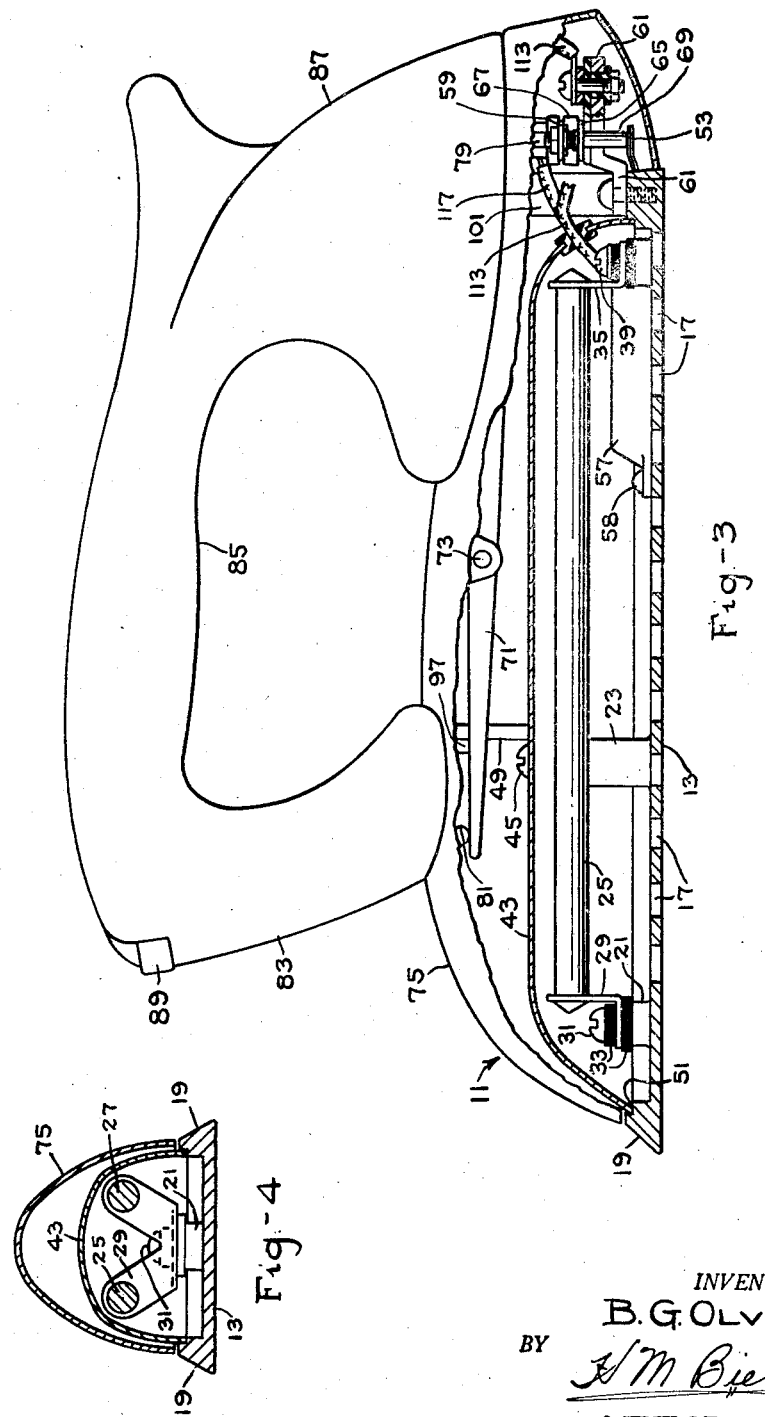
INVENTOR.
B. G. OLVING.
BY
ATTORNEY.

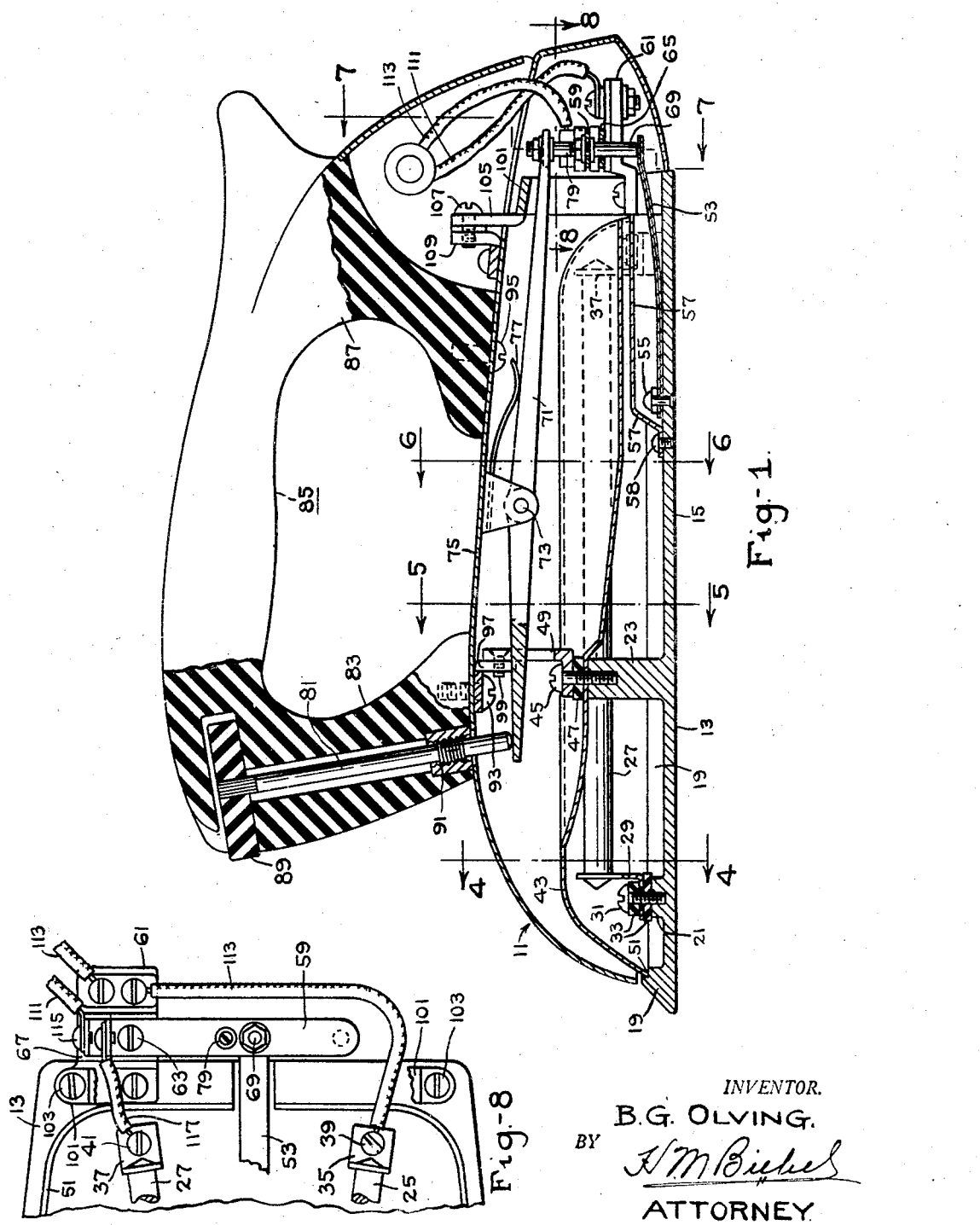

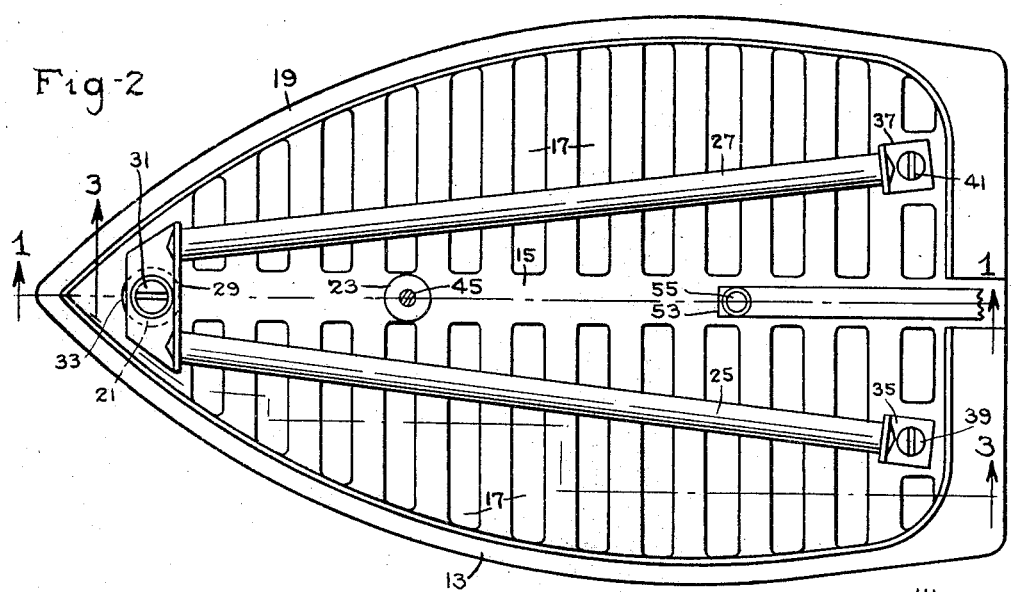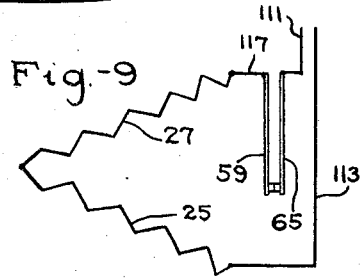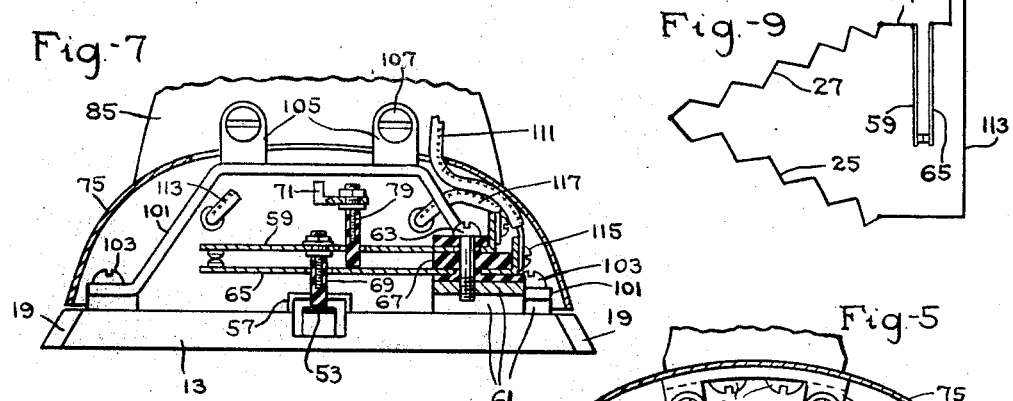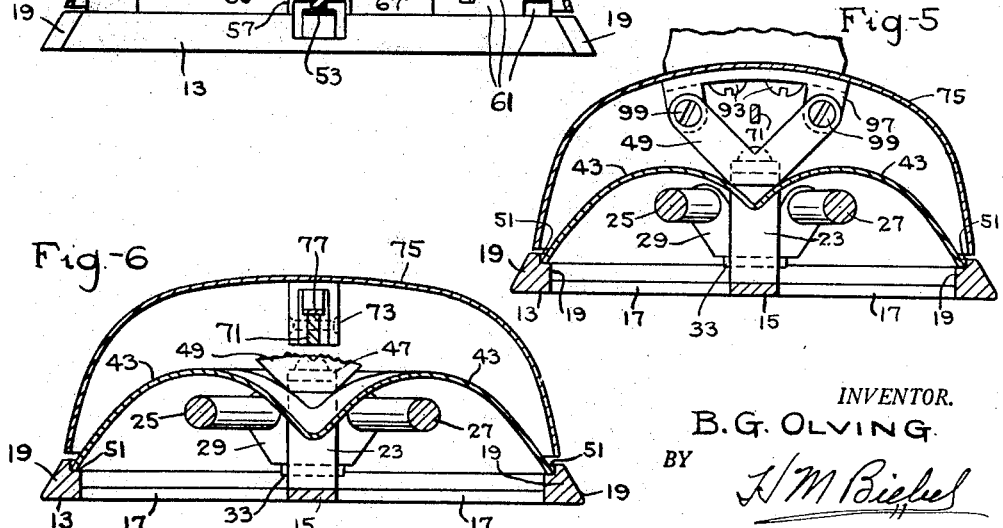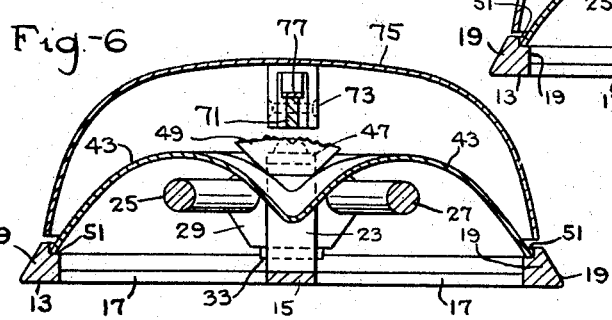

Patented July 2, 1946

2,403,115

UNITED STATES PATENT OFFICE 2,403,115

ELECTRIC SADIRON

Bror G. Olving, Elgin, Ill., assignor to McGraw Electric Company, Elgin, Ill., a corporation of Delaware Application December 11, 1944, Serial No. 567,578

6 Claims. (Cl. 219—25)

My invention relates to electric sad irons and particularly to sole plates for electric sad irons.

An object of my invention is to provide a sole plate for an electric iron that shall have relatively small weight and relatively small thermal storage capacity.

Another object of my invention is to provide a sole plate for an electric iron that shall cause some of the heat of the electric heating means to reach directly and act upon the work being ironed.

Another object of my invention is to provide a sole plate for an electric iron that shall effect dual heat transmission to the work being ironed, namely by heat conducted by the sole plate and by heat radiated directly against the work.

Another object of my invention is to provide a sole plate for an electric iron, that has an extremely quick response to thermostat demand.

In the drawings,

Figure 1 is a vertical, longitudinal, sectional view through an electric iron, taken on the line 1—1 of Fig. 2.

Fig. 2 is a top plan view of the sole plate with the heating elements attached thereto, Fig. 3 is a partial longitudinal, sectional view therethrough, taken on the line 3—3 of Fig. 2, Fig. 4 is a vertical, lateral, sectional view therethrough, taken on the line 4—4 of Fig. 1, Fig. 5 is a vertical, lateral, sectional view therethrough, taken on the line 5—5 of Fig. 1, Fig. 6 is a vertical, lateral, sectional view therethrough, taken on the line 6—6 of Fig. 1, Fig. 7 is a vertical, lateral, sectional view therethrough, taken on the line 7—7 of Fig. 1, Fig. 8 is a fragmentary, horizontal, sectional view therethrough, taken on the line 8—8 of Fig. 1, and, Fig. 9 is a view showing the diagram of connections of the electric circuits of the iron.

I have illustrated an electric iron, designated generally by the numeral 11, as comprising a sole plate 13, which is made relatively thin and is preferably made of either aluminum or brass. The sole plate is provided with a central, longitudinally-extending rib 15 and a plurality of laterally-extending slots 17 extending from the central rib 15 up to within a vertical, peripheral shoulder 19. The sole plate 13 is provided also with an upstanding boss 21 integral with the central rib 15 at the forward end portion thereof. I provide further a central, upstanding boss 23, which is also integral with the central rib 15. Instead of slots 17, I may also use a plurality of openings in sole plate 13.

I provide a pair of heating elements 25 and 27 of substantially rod shape, which heating elements extend substantially longitudinally of the iron; and while I prefer to use heating elements of carbonaceous material, I do not desire to be limited thereto, since I may make these heating elements of an electric-insulating refractory rod, having provisions thereon for winding therearound a metallic resistor member. I provide a front support and connector for the two heating elements 25 and 27, comprising a metallic member 29 of substantially L-shape having the horizontally-extending portion thereof secured against the upper surface of the relatively short lug 21 by a screw 31, a pair of washers 33 of electric-insulating material being provided to electrically insulate the metallic member 29 from the sole plate 13. Member 29 is of substantially Y-shape, with indentations in the upper end portions of the prongs to receive the conical end portions of resistors 25 and 27. I provide a pair of supports 35 and 37, which are each of substantially L-shape and are held in proper operative position by short machine screws 39 and 41, screwed into, but electrically insulated from the rear end portion of the sole plate 13 and spaced apart laterally from the central rib 15. If the heating elements 25 and 27 are made of carbonaceous material, I may metalize the end portions so as to provide good current-conducting engagement between the members 29, 35, and 37 and the end portions of the heating elements 25 and 27.

I provide also a two-part reflector 43, which is held in proper operative position above the heating elements 25 and 27 by a short machine screw 45, which has screw-threaded engagement with the lug 23. I provide a washer 47 of heat-insulating material between a bracket 49 of substantially L-shape in section and the reflector 43. The reflector 43 is provided with two substantially horizontally-extending concave lobes or parts, which are of substantially parabolic shape in lateral section and the heating elements 25 and 27 occupy the focal points of said parts. The shoulder 19 is provided with an inner recess 51, and the lower, outer, peripheral edge of the reflector 43 is adapted to be held in close operative engagement with the sole plate by the screw 45 when the same is properly tightened up against the washer 47 and the bracket 49.

I provide also a bimetal bar 53, which has one end, namely the forward or inner end, secured to the rear end portion of the central rib 15 by a rivet 55. A cover member 57 is also secured to the central rib 15 by a machine screw 59 and covers substantially the greater portion of the length of bimetal bar 53, or at least that portion thereof which is subject to direct radiant heat from the heating elements 25 and 27.

The bimetal bar 53 is adapted to actuate the upper of two contact bars, namely contact bar 59, which has one end thereof insulatedly secured against a bracket 61 as by a short machine screw 63. A second contact bar 65 is also provided and is held by screw 63, a plate 67 of electric-insulating material being located between the two contact bars 59 and 65, a second plate, of electric-insulating material, being located between the bottom surface of contact bar 65 and bracket 61 and a third plate, of electric-insulating material insulating the head of screw 63 from the upper contact arm 59. The bimetal bar 53 operatively engages the upper contact bar 59, actuating the same by a short rod or bar 69 of electric-insulating material, which is suitably secured to the upper contact bar 59. An opening is provided in the lower contact bar 65, through which the rod 69 may extend. Contact bar 65 is biased in a clockwise direction, as seen in Fig. 7, so that it will be and remain in engagement with the upper contact bar 59 until the same has been moved out of engagement with the lower contact arm 65 by a flexing of the bimetal bar 53 upwardly away from the sole plate when the latter is heated. Means for adjusting the temperature of the sole plate 13 comprise a lever arm 71, which is pivotally mounted on a bracket 73 secured against the under surface of a casing 75 and having a biasing spring 77 causing said arm 71 to be biased in a clockwise direction, whereby a rod 79 of electric-insulating material, having its upper end secured to the rear end of arm 71, will extend through an opening in the upper contact bar 59 into engagement with the intermediate portion of the lower contact bar 65.

Means for adjusting arm 71 comprise a rod 81 extending through an opening in a front handle support 83 comprising a part of a handle structure 85, including also a rear handle support 87. The adjusting rod 81 has an upper, substantially circular adjusting knob 89 fixed thereon and has screw-threaded engagement with a metallic insert 91 in the lower end portion of the front handle support 83. Rod 81 is adapted to operatively engage the front end portion of arm 71, so that it may pivotally adjust arm 71 on its pivot in bracket 73, whereby the operating temperature of sole plate 13 may be adjusted and varied as may be desired.

The handle structure 85 is secured against the casing 75 as by a plurality of forward short machine screws 93, as well as by a pair of short machine screws 95 engaging the lower handle support 87. A bracket 97 of substantially L-shape is secured by the screws 93 against the under surface of casing 75 and has a pair of spaced openings therein adapted to receive a pair of forwardly-extending lugs 99 constituting a part of bracket 49. I provide further a bracket 101, which is of substantially inverted U-shape having its lower, outer ends secured against the rear end portion of sole plate 13 as by a pair of machine screws 103. Bracket 101 has a pair of upstanding spaced lugs 105, through which a pair of short machine screws 107 may extend and have screw-threaded engagement with a pair of brackets 109, each of substantially L-shape and secured to the outer or upper surface of casing 75 as by short machine screws to hold the casing 75 in proper operative position.

I provide a twin conductor cord, comprising conductors 111 and 113, which extends into the rear handle support from the right hand side thereof, as seen when looking at the rear end of the iron, and conductor 111 is adapted to be connected to the lower contact bar 65 by a short machine screw 115. Contact bar 59 is adapted to be connected by a conductor 117 to the rear end portion of heating element 27, while the rear end portion of heating element 25 is adapted to be connected with conductor 113.

It is evident that the heat storage capacity of the relatively thin sole plate is relatively small and that it cannot store up any appreciable amount of heat therein. It is further evident that since the area of the slots or openings 17 is on the order of one-half of the total area of surface of the ironing surface of the sole plate, substantially one-half of the heat generated in the heating elements 25 and 27, which are operated at a temperature to generate radiant heat, will reach the goods or work being ironed directly and will penetrate and cause rapid drying of the moisture underneath the outer, upper surface of the work engaged by the ironing surface of the sole plate.

The temperature of the ironing surface of the sole plate will also follow the adjustments effected by turning the adjusting knob 89, very quickly and without any appreciable time delay.

Various modifications may be made in the device embodying my invention without departing from the spirit and scope thereof, and all such modifications coming clearly within the scope of the appended claims shall be considered a part of my invention.

I claim as my invention:

1. An electric sad iron comprising a relatively thin sole plate having a plurality of openings therein, the area of said openings being on the order of one-half that of the sole plate, a plurality of electric heating elements, of rod shape, thereabove and a reflector over said heating elements.

2. An electric sad iron comprising a relatively thin light weight sole plate having a plurality of laterally-extending slots therein, the total area of said slots being on the order of one-half that of the sole plate, a plurality of electric heating elements, of rod shape, thereabove and a single reflector over said heating elements.

3. An electric sad iron comprising a relatively thin light weight sole plate having a plurality of laterally-extending slots therein, the total area of said slots being on the order of one-half that of said sole plate, a plurality of electric heating elements, of rod shape, thereabove, a single metallic reflector over said heating elements having its lower edge in engagement with an upper surface of said sole plate and means operatively engaging said sole plate for holding said reflector in close engagement with said sole plate.

4. An electric sad iron comprising a relatively thin metal sole plate, having a plurality of laterally-extending slots therein and a shouldered raised peripheral portion, a plurality of electric heating elements, of rod shape, extending substantially longitudinally of the iron, thereabove, a single reflector over said heating elements having a plurality of parabolic surfaces and having its outer, lower, circumferential edge in close engagement with said shouldered portion, a single upstanding lug centrally of the sole plate of such height that the rod-shaped heating elements are located in the focal points of the parabolic surfaces and means engaging said upstanding lug for holding said reflector in close engagement with said sole plate.

5. An electric sad iron comprising a relatively thin light weight sole plate having a solid longitudinally-extending central rib and a plurality of slots extending laterally from said central rib, a pair of electric heating elements, of rod shape, extending substantially longitudinally of the sole plate, thereabove, means insulatedly supporting said heating elements from said sole plate, a single reflector having a pair of parabolic reflecting surfaces therein and having its outer lower circumferential edge in close engagement with said sole plate, a single upstanding lug centrally of the sole plate and means engaging said upstanding lug for holding said reflector in close engagement with the sole plate.

6. An electric sad iron comprising a relatively thin light-weight sole plate having a solid longitudinally-extending central rib and a plurality of slots extending laterally from said central rib, a pair of electric heating elements, of rod shape extending substantially longitudinally of the sole plate above said slots, said heating elements being operated at a temperature to generate radiant heat, a single reflector over said heating elements having a pair of parabolic reflecting surfaces therein to reflect substantially all of the radiant heat reaching them from the heating units against the sole plate and the work therebeneath, a single upstanding lug in said central rib and means engaging said lug for holding the lower edge of said reflector in close engagement with said sole plate.

BROR G. OLVING.